United States Patent

Chen

[15] 3,689,900

[45] Sept. 5, 1972

[54] PHOTO-CODED DIODE ARRAY FOR READ ONLY MEMORY

[72] Inventor: Arthur C. M. Chen, Schenectady, N.Y.

[73] Assignee: General Electric Company

[22] Filed: Aug. 31, 1970

[21] Appl. No.: 68,102

[52] U.S. Cl. .....................340/173 LM, 235/61.11 E, 317/235 VA, 317/235 N, 340/173 LS, 340/173 SP

[51] Int. Cl. .....G11c 11/36, G11c 11/42, H01l 15/06

[58] Field of Search .................317/235 UA, 235 N; 340/173LS, 340/173 LM, 173 SP; 235/61.11 E

[56] References Cited

UNITED STATES PATENTS 3,551,761 12/1970 Ruoff.....................317/235 N 3,488,636 1/1970 Dyck..................340/173 LM 3,437,890 4/1969 Krohl.....................317/235 R 3,382,115 5/1968 Carter..................340/173 SP 3,201,764 8/1965 Parker..................340/173 LS

*Primary Examiner*—Bernard Konick
*Assistant Examiner*—Stuart Hecker
*Attorney*—Richard R. Brainard, Paul A. Frank, Frank L. Neuhauser, Oscar B. Waddell, Joseph B. Forman and Paul F. Wille

[57] ABSTRACT

A diode read only memory array is disclosed in which the intersecting signal lines of the array are connected by a series circuit comprising a conventional diode and a photodiode, oppositely poled. Information is stored by selectively irradiating the array to produce reverse conduction in selected ones of the photodiodes. The integrated circuit structure used in fabricating the memory array is also disclosed.

4 Claims, 6 Drawing Figures

INVENTOR:
ARTHUR C.M. CHEN,
by Paul F. Wille
HIS ATTORNEY

INVENTOR:
ARTHUR C.M. CHEN,
by Paul F. Wille
HIS ATTORNEY

PHOTO-CODED DIODE ARRAY FOR READ ONLY MEMORY

PHOTO-CODED DIODE ARRAY FOR READ ONLY MEMORY

This invention relates to read only memories, and, in particular, to read only memories comprising a diode array.

In previous diode memory arrays, a matrix comprising intersecting DATA and WORD lines contained diodes at selected intersections depending upon the information to be stored, i.e. a diode connecting the particular intersecting DATA and WORD lines indicates a logic "1" and the absence of a diode connection indicates a logic "0".

With the advent of integrated circuit and thin film technology, read only memory arrays were fabricated from "blanks" containing a diode at each intersection on the substrate. Information was then stored by mechanically breaking the connection between selected diodes and the intersections. One method employed for doing this was to use an electron beam to sever the connection. There was thus provided a read only diode memory array that was fairly inexpensive.

A problem with this type of array, however, is that the information stored cannot be changed, except to convert additional "1's" to "0's."

One method of providing a semi-permanent read only memory, i.e. a memory in which the diodes or their connections are not permanently destroyed, is to add electrically variable elements to the array, such as photoresistors. Information is then stored by selectively exposing the photoresistors to light. Photoresistors, however, often do not provide a sufficient change in resistance so that one can easily determine whether a "1" or a "0" is being stored.

Further, any changes in the diode array, such as adding further elements, must be done without greatly increasing the area occupied by the storage unit and without greatly complicating the fabrication of the array.

In view of the foregoing, it is therefore an object of the present invention to provide a read only diode memory array in which the array is not permanently changed for information to be stored.

Another object of the present invention is to provide an improved diode read only memory array which entails few additional fabrication steps.

A further object of the present invention is to provide a photocoded diode memory array in which logic "1's" and "0's" are readily distinguishable.

The foregoing objects are achieved in the present invention wherein a photoconductive diode is series connected with a "conventional" diode at each intersection of the array. In a preferred embodiment of the present invention, the conventional diode is a Schottky or surface barrier diode formed atop the photodiode. Light is permitted to be incident to the photodiode by etching away a portion of the substrate on the opposite side of the substrate from the Schottky diode. By stacking the diodes no greater surface area is occupied by the additional component.

A more complete understanding of the present invention may be obtained by considering the following detailed description in conjunction with the accompanying drawings in which.

Figure 1:
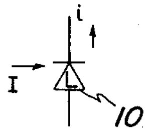
FIG. 1 illustrates a photoconductive diode.

Referring to FIG. 1 there is illustrated a symbol for the photoconductive diode utilized in the present invention. Specifically photoconductive diode 10 has the characteristic that its reverse bias current increases with intensity of incident light.

Figure 2:
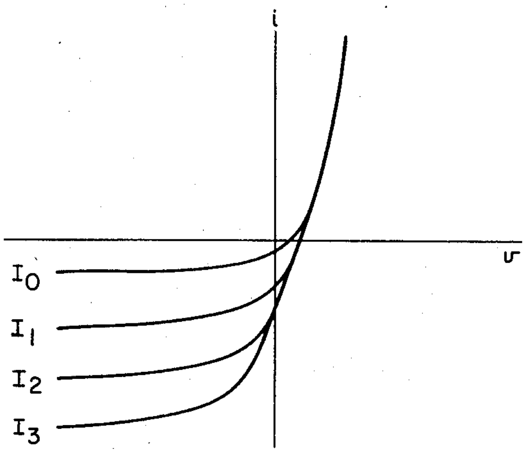
FIG. 2 illustrates characteristic curves for photoconductive diode of FIG. 1.

A graph of the characteristics of photoconductive diode 10 is illustrated in FIG. 2. As can be seen from FIG. 2, at a very low or zero incident light intensity, $I_0$, the back bias current through diode 10 is relatively small. As the level of intensity of the light incident upon photoconductive diode 10 increases the back bias current increases as illustrated by the family of curves designated $I_1$, $I_2$, $I_3$.

Figure 3:
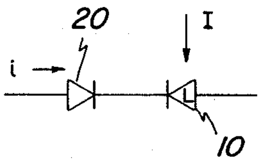
FIG. 3 illustrates the series circuit forming the basic storage unit of the present invention.

FIG. 3 illustrates an embodiment of the present invention wherein conventional diode 20 is series connected, but oppositely poled, to photoconductive diode 10. The diode series circuit illustrated in FIG. 3 would be utilized to connect the WORD and DATA lines forming the matrix of the diode memory array. Each intersection of a DATA and WORD line would be interconnected by a diode series circuit as illustrated in FIG. 3.

Figure 4:
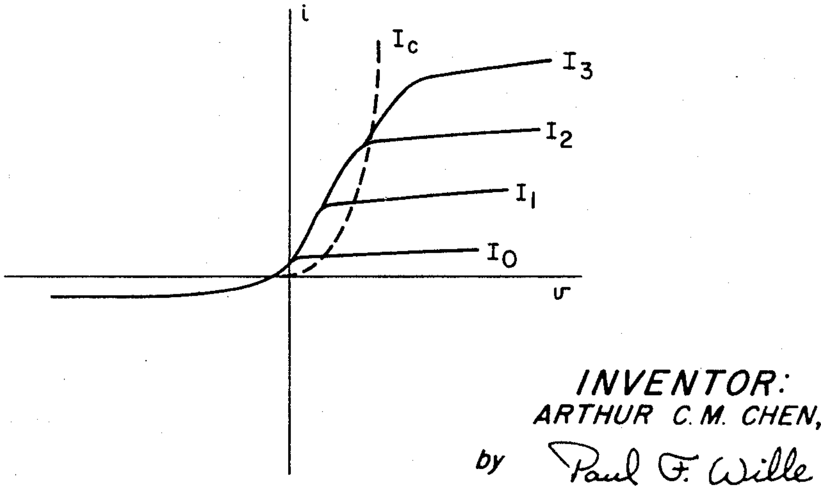
FIG. 4 illustrates characteristic curves showing the composite effect of the series circuit.

The characteristics of the diode series circuit is illustrated in FIG. 4. The characteristics of both diode 10 and diode 20 are combined in producing the characteristic curves illustrated in FIG. 4. The forward bias conduction, forward relative to conventional diodes 20, is dependent upon the intensity of light I incident upon photoconductive diode 10. Dotted curve $I_C$ represents the forward bias current characteristic curve for a conventional diode. As can be seen from FIG. 4, the back bias resistance of photoconductive diode 10 varies greatly with the intensity of incident light. A light to dark current ratio as high as $10^4$ to 1 may be obtained by utilizing a photoconductive diode. Thus the change in resistance caused by a change in light intensity may be readily sensed since the photoconductive diode produces current variations approaching that obtainable from open and short circuits.

Figure 5:
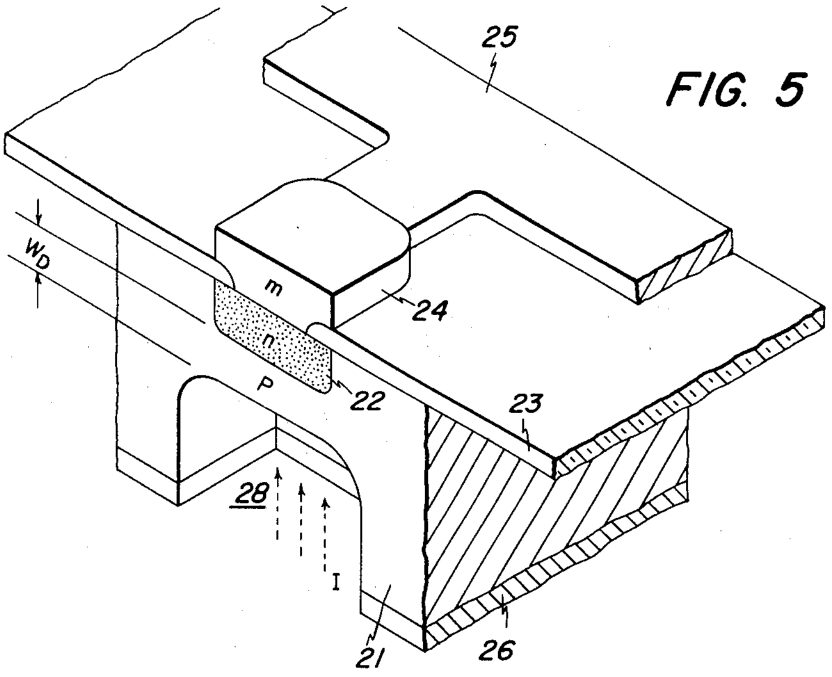
FIG. 5 illustrates, in perspective, the fabrication of the series circuit.

A specific embodiment of one possible way in which the diode series circuit of the present invention may be fabricated is illustrated in FIG. 5. In FIG. 5 substrate 21 has diffused therein a region of conductivity differing from that of the substrate. In the specific example shown in FIG. 5 the substrate is considered p-type of material and the diffused region is considered n-type material. The type of conductivity chosen is a matter of design provided that the conductivity type of region 22 differ from that of substrate 21. Substrate 21 has insulating layer 23 applied thereto which may, for example, comprise silicon dioxide which is "grown" by oxidizing the substrate at an elevated temperature. The formation of region 22 may be carried out after the oxidation of substrate 21 by diffusing through a window in the oxide layer. The only requirement of region 22 is that it have a high resistivity necessary for the Schottky or surface barrier metallization. The Schottky or surface barrier metal 24 is applied atop the n-type diffused region 22. There is thus formed by the construction described so far a series diode circuit comprising the p-n junction formed by substrate 21 and diffused region 22 and a second diode formed by diffused region 22 and the surface barrier metallization layer 24. Thus by the addition of one element, diffused region 22, two diodes are thus formed by utilizing the diffused region as the common electrode between the two diodes.

A photoconductive effect is obtained from the p-n junction by removing a portion of the substrate on the opposite of the substrate from diffused region 22. Hollowed-out region 28 may be formed by any suitable means, for example, by etching away the substrate. The removal of material from the back side of substrate 21 continues until the space between the inner portion of the cavity thus formed and the diffused region are separated by approximately a depletion width from the p-n junction. This width is designated $W_D$ in FIG. 5. Incident light I entering the hollowed-out portion 28 of substrate 21 induces the photoconduction of current across the p-n junction when reversed biased. After the addition of the surface barrier metallization layer and the etching away of material from the opposite side of substrate 21 conductive leads 25 and 26, which may comprise gold beams, are then applied to the substrate thereby forming the matrix array of WORD and DATA lines.

As can be seen from the foregoing description, the addition of photoconductive diode 10 to a conventional diode matrix does not substantially increase the area occupied by any interconnection between the WORD and DATA lines. Further, the modifications to the conventional diode array may be readily carried out during the fabrication of that array.

Figure 6:
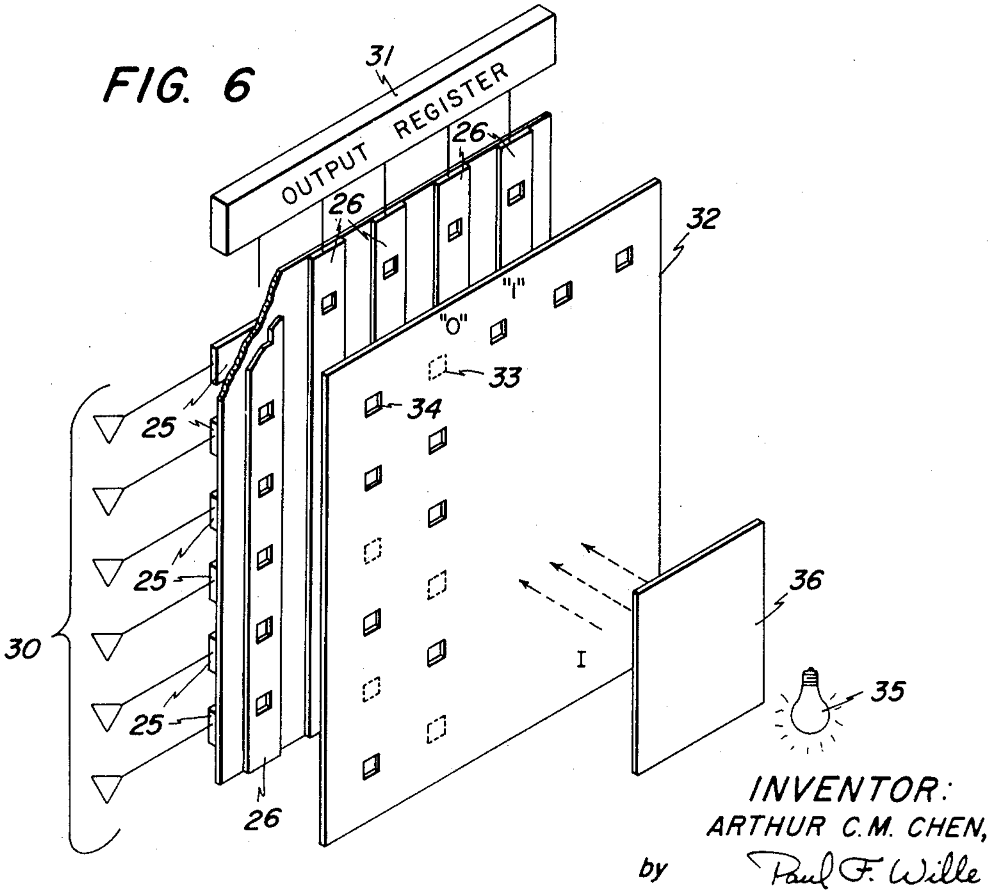
FIG. 6 illustrates the utilization of the series circuit in a memory array.

FIG. 6 illustrates a complete diode array and further illustrates how information may be semi-permanently stored by the memory array. Specifically in FIG. 6 a plurality of WORD lines 25 are coupled to a plurality of driver amplifiers 30 and a plurality of DATA lines 26 are coupled to output register 31. Information is stored within the memory by controlling the incidence of light upon photoconductive diodes 10. This is accomplished by inserting a mask 32 between a source of light and the diode array. Mask 32 comprises a plurality of regions that are in the same geometric pattern as the photoconductive diodes. EAch of these regions may be made either opaque or translucent depending upon the information to be stored. For example, where a logic "1" is to be stored the region may be made translucent as illustrated by region 34. Where a logic "0" is to be stored, the region is made opaque as illustrated by region 33. A source of light to be used with mask 32 is illustrated by light source 35 and diffusion sheet 36 which is utilized to provide a more uniform illumination of mask 32. Any suitable source of light providing fairly uniform illumination may be utilized.

There is thus provided a read only memory in which the information stored by the diode array does not depend upon the partial destruction of the diode array. Rather a photoconductive diode provides a high or low resistance connection between the DATA and WORD lines. Further with this type of memory the information to be stored may be readily changed by changing the pattern of opaque and translucent areas in mask 32. Translucent areas 34 in mask 32 may be transparent and may conveniently comprise holes punched in the mask material.

Having thus described the invention it will be apparent to those of skill in the art that many modifications may be made without departing from the spirit and scope of the present invention.

What I claim as new and desire to secure by Letters Patent of the United States is:

1. A photocoded diode read only memory array comprising:
   - a matrix comprising a plurality of intersecting WORD and DATA lines;
   - a series circuit for electrically interconnecting a single WORD line to a single DATA line at each intersection, each series circuit comprising a diode and a photoconductive diode series connected and oppositely poled and formed as
   - a semiconductor substrate of a first conductivity type;
   - a doped region of a second conductivity type diffused into said substrate;
   - said substrate having a hollowed-out region opposite said doped region, said hollowed-out region being spaced from said doped region by a predetermined distance; and
   - a surface-barrier metallization layer deposited atop said doped region, whereby said substrate and said doped region form said photoconductive diode and said doped region and said surface barrier layer form said diode;
   - light source means; and
   - mask means having opaque or translucent areas corresponding to the pattern of said photoconductive diodes in said matrix and interposed between said light source and said matrix, wherein the information to be stored determines whether a given area is opaque or translucent.

2. An array as set forth in claim 1 wherein said predetermined distance is approximately one depletion width.

3. An improved read only diode memory array containing a plurality of diodes located one each at intersections of WORD and DATA lines of said array for interconnecting a WORD and a DATA line, wherein each of said diodes comprising a surface barrier metallization area deposited on a substrate of semiconductive material of a first conductivity type, the improvement comprising:
   - a region of second conductivity type diffused into said substrate underneath each surface barrier metallization area, and
   - said substrate having a hollowed-out portion on the opposite side of said substrate from said region and spaced from said region by a predetermined distance, whereby said region forms the common electrode of a pair of series connected, oppositely poled diodes and said hollowed-out portion enables one of said diodes to exhibit photoconductive characteristics.

4. An improved memory array as set forth in claim 3, wherein said predetermined distance is approximately one depletion width in said substrate material.

* * * * *